United States Patent [19]
Broderick

[11] Patent Number: 5,702,170
[45] Date of Patent: Dec. 30, 1997

[54] FIBER OPTICS CHRISTMAS TREE

[76] Inventor: James H. Broderick, 5701 Seifert Ave., San Jose, Calif. 95118

[21] Appl. No.: 654,086

[22] Filed: May 28, 1996

[51] Int. Cl.$^6$ .................. F21V 8/00; F21P 3/00
[52] U.S. Cl. .................. 362/32; 362/123; 362/252; 362/806
[58] Field of Search .................. 362/32, 123, 806, 362/252

[56] References Cited

U.S. PATENT DOCUMENTS

| | | | |
|---|---|---|---|
| 3,431,410 | 3/1969 | Dolan et al. | 362/32 |
| 3,465,139 | 9/1969 | Siegal | 362/32 |
| 3,564,233 | 2/1971 | Cox et al. | 362/123 |
| 3,641,335 | 2/1972 | Wall | 362/123 |
| 3,766,376 | 10/1973 | Sadacca et al. | 362/123 |
| 4,060,722 | 11/1977 | Foley | 362/123 |
| 4,068,118 | 1/1978 | Carrington | 362/123 |
| 4,072,857 | 2/1978 | DeVicaris | 362/252 |
| 4,364,102 | 12/1982 | Huppert et al. | 362/123 |
| 4,777,571 | 10/1988 | Morgan | 362/123 |
| 4,858,086 | 8/1989 | Pietrantonio et al. | 362/123 |
| 4,878,157 | 10/1989 | Koch | 362/123 |
| 5,104,608 | 4/1992 | Pickering | 362/123 |
| 5,226,709 | 7/1993 | Labranche | 362/123 |
| 5,306,366 | 4/1994 | Shattan | 362/123 |
| 5,422,797 | 6/1995 | Shattan | 362/123 |
| 5,517,390 | 5/1996 | Zins | 362/252 |
| 5,558,421 | 9/1996 | Guastella | 362/806 |
| 5,558,422 | 9/1996 | Sanford | 362/123 |

Primary Examiner—Ira S. Lazarus
Assistant Examiner—Matthew Spark
Attorney, Agent, or Firm—Michael I. Kroll

[57] ABSTRACT

A fiber optics Christmas tree comprising a hollowed out artificial Christmas tree frame. A structure is for transmitting light through the hollowed out artificial Christmas tree frame. A facility is for supplying light to the light transmitting structure within the hollowed out artificial Christmas tree frame, so that points of light can be seen at distal ends of the light transmitting structure in the hollowed out artificial Christmas tree frame.

1 Claim, 2 Drawing Sheets

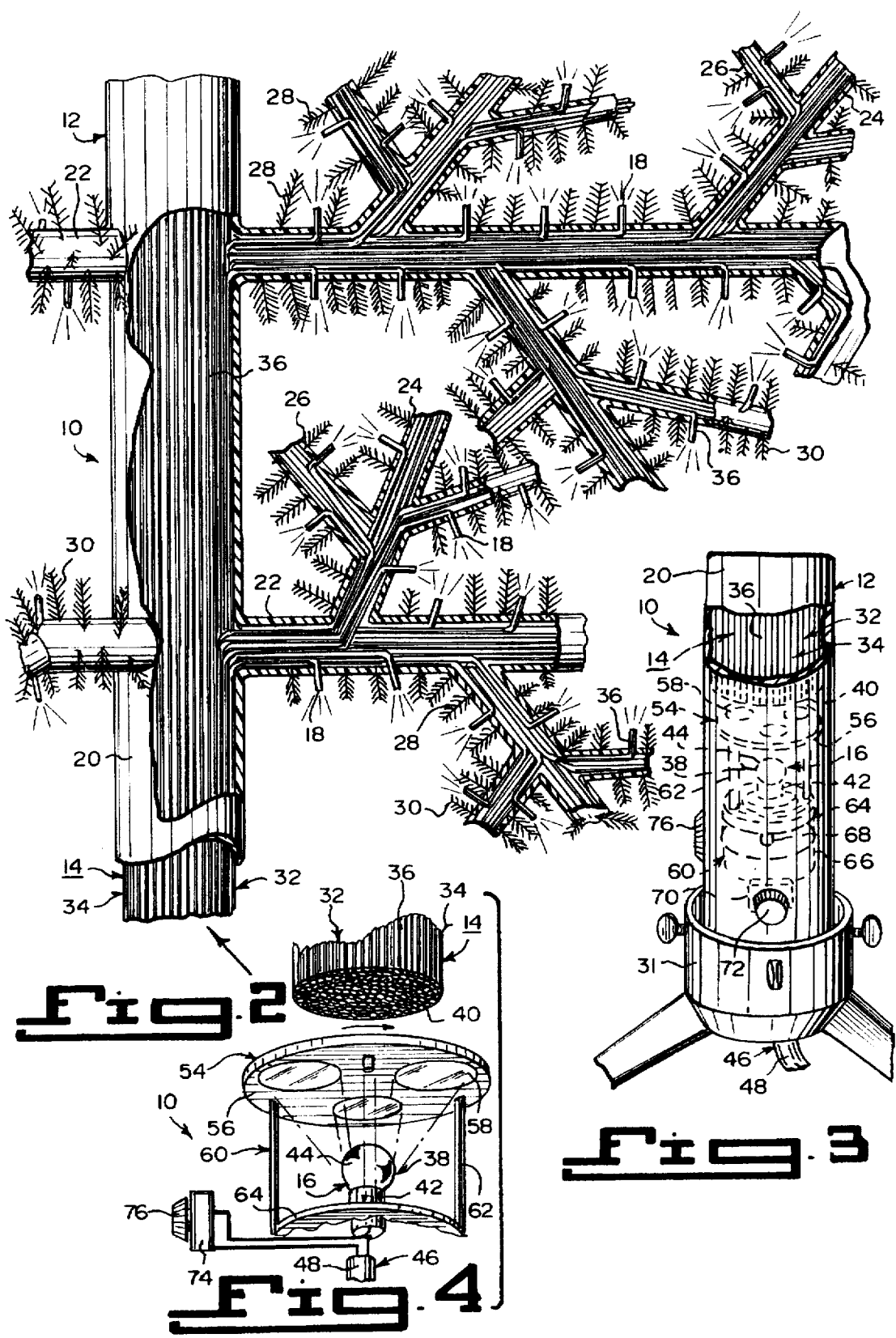

5,702,170

FIBER OPTICS CHRISTMAS TREE

BACKGROUND OF THE INVENTION

1. Field of the Invention

The instant invention relates generally to illumination devices and more specifically it relates to a fiber optics Christmas tree.

2. Description of the Prior Art

Numerous illumination devices have been provided in prior art that are adapted to supply light to various objects, especially in darkened areas or at night. While these units may be suitable for the particular purpose to which they address, they would not be as suitable for the purposes of the present invention as heretofore described.

SUMMARY OF THE INVENTION

A primary object of the present invention is to provide a fiber optics Christmas tree that will overcome the shortcomings of the prior art devices.

Another object is to provide a fiber optics Christmas tree, in which a fiber optics system is used to light a hollowed out artificial Christmas tree frame, so that no unsightly wires would show to distract from the beauty of the tree.

An additional object is to provide a fiber optics Christmas tree, in which a multiple color lighting effect is made by using a motor driven color wheel and a high intensity light bulb to illuminate the fiber optics system within the hollowed out artificial Christmas tree frame.

A further object is to provide a fiber optics Christmas tree that is simple and easy to use.

A still further object is to provide a fiber optics Christmas tree that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an enlarged perspective view of a portion of the instant invention with parts broken away and in section, showing the fiber optics bundle extending through the hollowed out artificial Christmas tree frame.

FIG. 3 is an enlarged perspective view of an area of FIG. 1 as indicated by arrow 3.

FIG. 4 is a perspective view showing the color wheel and the high intensity light bulb in greater detail.

Similar reference characters denote corresponding features consistently throughout the attached drawings.

DETAILED DESCRIPTION OF THE PREFERRED EMBODIMENTS

Figure 1:
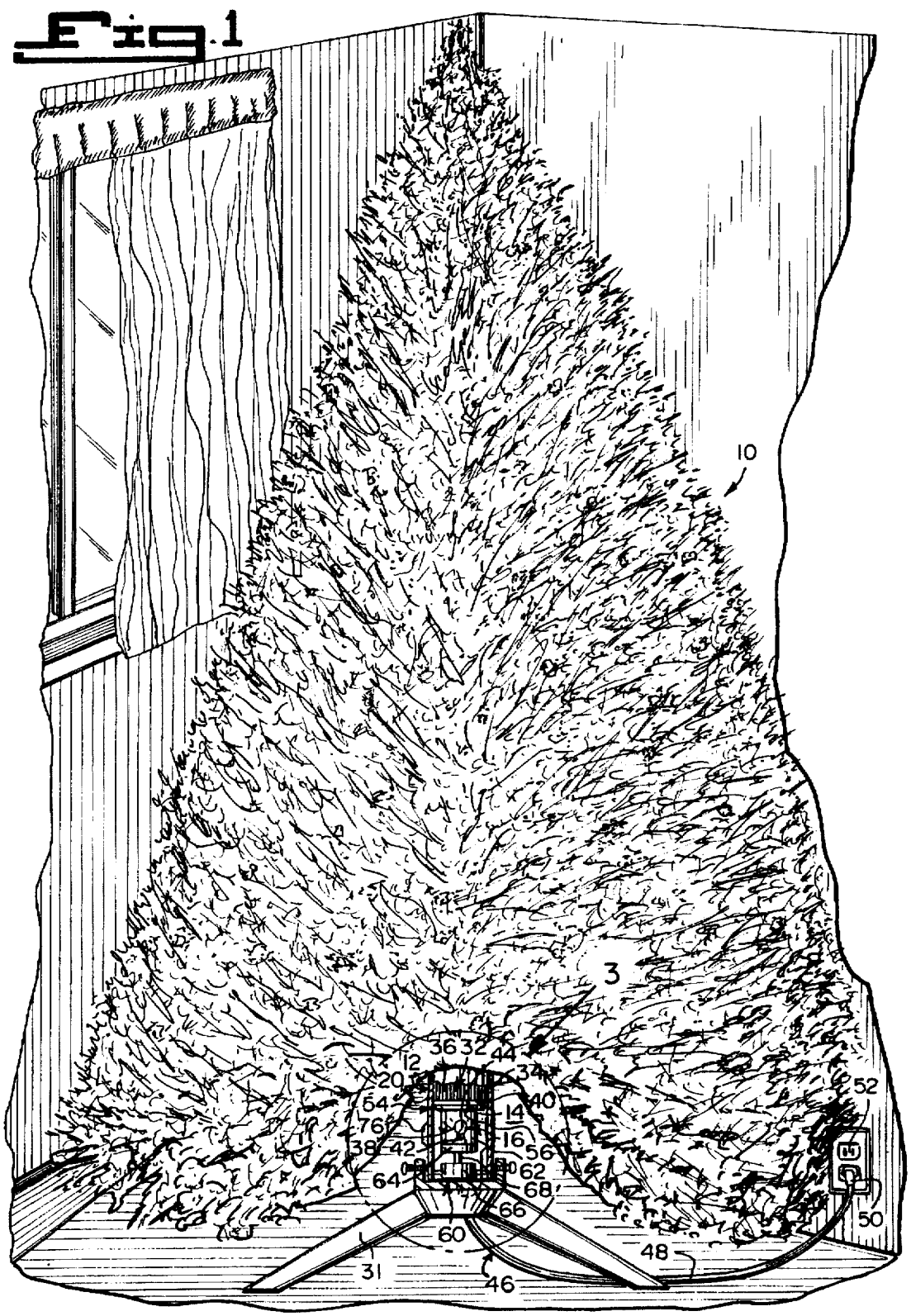
FIG. 1 is a perspective view of the instant invention with parts broken away and in section, installed in a room of a building.

Turning now descriptively to the drawings, in which similar reference characters denote similar elements throughout the several views, FIGS. 1 through 4 illustrate a fiber optics Christmas tree 10 comprising a hollowed out artificial Christmas tree frame 12. A structure 14 is for transmitting light through the hollowed out artificial Christmas tree frame 12. A facility 16 is for supplying light to the light transmitting structure 14 within the hollowed out artificial Christmas tree frame 12, so that points of light can be seen at distal ends 18 of the light transmitting structure 14 in the hollowed out artificial Christmas tree frame 12.

The hollowed out artificial Christmas tree frame 12, as best seen in FIG. 2, includes a hollow trunk 20. A plurality of hollow limbs 22 extend from the hollow trunk 20. A plurality of hollow branches 24 extend from each hollow limb 22. A plurality of hollow twigs 26 extend from each hollow branch 24. A plurality of stems 28 extend from the hollow limbs 22, the hollow branches 24 and the hollow twigs 26. A plurality of fake evergreen needles 30 extend about each stem 28. A stand 31, as shown in FIGS. 1 and 3, is connected to a lower end of the hollow trunk 20, to support the hollow trunk 20 in an upright position.

The light transmitting structure 14 is a fiber optics system 32 built within the hollowed out artificial Christmas tree frame 12. The fiber optics system 32 consists of a fiber optics bundle 34 having a plurality of optical fibers 36 extending within the hollowed out artificial Christmas tree frame 12. The points of light can be seen at the distal ends 18. The optical fibers 36 extend through various locations in the hollowed out artificial Christmas tree frame 12.

The light supplying facility 16 is an illumination assembly 38 at a bottom end 40 of the light transmitting structure 14. The illumination assembly 38 contains a light socket 42. A high intensity light bulb 44 is carried in the light socket 42. An assemblage 46 is for supplying electricity to the light bulb 44.

The electricity supplying assemblage 46 consists of an elongated power cord 48 electrically connected to and extending from the light socket 42. A plug 50 is on a distal end of the power cord 48, to engage with an electrical wall socket 52. The light socket 42, the high intensity light bulb 44 and the bottom end 40 of the light transmitting structure 14 are located within the lower end of the hollow trunk 20 of the hollowed out artificial Christmas tree frame 12.

An apparatus 54 for causing a color lighting effect is located between the high intensity light bulb 44 in the light socket 42 and the bottom end 40 of the light transmitting structure 14. The color lighting effect causing apparatus 54 includes a wheel 56 having a plurality of transparent color windows 58 radially thereabout. The wheel 56 is rotatively mounted within the lower end of the hollow trunk 20 of the hollowed out artificial Christmas tree frame 12. Each color window 58 can pass between the high intensity light bulb 44 in the light socket 42 and the bottom end 40 of the light transmitting structure 14. A device 60 is for rotating the wheel 56.

The rotating device 60, as best seen in FIGS. 3 and 4, consists of the wheel 56 having a plurality of spaced apart legs 62 extending downwardly adjacent to the perimeter of the wheel 56. A ring 64 is affixed to the lower ends of the legs 62. The ring 64 is centrally positioned about the light socket 42. A small electric motor 66 having a drive shaft 68 is rotatively mounted to the ring 64. The motor 66 is electrically connected to the power cord 48. When the motor 66 is turned on the wheel 56 will rotate.

A motor speed control unit 70 has a control knob 72 in the lower end of the hollow trunk 20 of the hollowed out artificial Christmas tree frame 12. The motor speed control unit 70 is connected between the motor 66 and the power cord 48. When the speed control knob 72 is manually operated, the speed of the motor 66 will be adjusted to control the rotation speed of the wheel 56.

An on/off switch and dimmer unit 74 has a control knob 76 in the lower end of the hollow trunk 20 of the hollowed out artificial Christmas tree frame 12. The on/off switch and dimmer unit 74 is electrically connected between the light socket 42 and the power cord 48. When the dimmer control knob 76 is manually operated, the amount of illumination will be adjusted coming from the high intensity light bulb 44 and the electricity can be completely shut off when needed.

LIST OF REFERENCE NUMBERS 10 fiber optics Christmas tree
12 hollowed out artificial Christmas tree frame of 10
14 light transmitting structure of 10
16 light supplying facility of 10
18 distal end of 14
20 hollow trunk of 12
22 hollow limb of 12
24 hollow branch of 12
26 hollow twig of 12
28 stem of 12
30 fake evergreen needles on 28
31 stand for 20
32 fiber optics system for 14
34 fiber optics bundle for 32
36 optical fiber of 34
38 illumination assembly of 16
40 bottom end of 14
42 light socket of 38
44 high intensity light bulb in 42
46 electricity supplying assemblage
48 elongated power cord of 46
50 plug on 48
52 electrical wall socket
54 color lighting effect causing apparatus
56 wheel of 54
58 transparent color window in 56
60 rotating device for 56
62 leg on 56
64 ring
66 small electric motor
68 drive shaft of 66
70 motor speed control unit
72 control knob of 70
74 on/off switch and dimmer unit
76 control knob of 74

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fiber optics Christmas tree comprising:

a) a hollowed out artificial Christmas tree frame comprising a one piece hollow trunk, a plurality of hollow limbs extending from said hollow trunk, a plurality of hollow branches extending from each said hollow limb, a plurality of hollow twigs extending from each said hollow branch, a plurality of stems extending from said hollow limbs, branches, add twigs, and a plurality of fake evergreen needles extending about each said stem;

b) means for supporting said trunk in an upright position comprising a stand connected to a lower end of said hollow trunk;

c) means for transmitting light through said hollowed out artificial Christmas tree frame comprising a fiber optics bundle extending within said trunk with light carrying fibers from said bundle extending into and through said limbs, branches, twigs, and stems terminating outside of said limbs, branches, twigs and stems throughout said tree so that points of light can be seen at the distal ends of said fibers throughout said tree, said bundle terminating within said tree trunk above said stand forming a space below said bundle and above said stand;

d) means for supplying light to said light transmitting means comprising an illumination assembly within said tree trunk below said fiber optics bundle including a light socket, a high intensity light bulb carried in said light socket, means for supplying electricity to said light bulb, and first switch means mounted on the outside of said hollow tree trunk for turning on and off and dimming the light emitted by said light bulb; and e) means for causing a color lighting effect comprising a rotatively mounted wheel located between said light bulb and said fiber optics bundle within said hollow tree trunk, said wheel having transparent color windows radially arranged, and means for rotating said wheel including a plurality of spaced apart legs extending downwards from the perimeter of said wheel, a ring affixed to lower ends of said legs with said ring centrally positioned about said light socket, and electric motor means having a drive shaft rotatively mounted to said ring to rotate said ring and wheel, including second switch means located on the outside of said hollow tree trunk for controlling the operation and speed of rotation of said wheel for changing the colors being delivered by said fiber optics bundle to and viewed at the distal ends of said fibers.

* * * * *